(12) United States Patent
Kwon

(10) Patent No.: US 10,997,621 B1
(45) Date of Patent: May 4, 2021

(54) SYSTEM FOR PROVIDING ARTIFICIAL INTELLIGENT HOME EDUCATION BIG DATA PLATFORM BY USING SAMPLING METHOD BASED ON MOBILE DEVICE AND THE OPERATING METHOD OF THE SAME

(71) Applicant: Yonghyun Kwon, Seoul (KR)

(72) Inventor: Yonghyun Kwon, Seoul (KR)

( * ) Notice: Subject to any disclaimer, the term of this patent is extended or adjusted under 35 U.S.C. 154(b) by 0 days.

(21) Appl. No.: 17/137,407

(22) Filed: Dec. 30, 2020

(30) Foreign Application Priority Data

Feb. 14, 2020 (KR) .................. 10-2020-0018391

(51) Int. Cl.
| | | |
|---|---|---|
| *G06Q 30/02* | (2012.01) | |
| *H04L 29/08* | (2006.01) | |
| *G06N 20/00* | (2019.01) | |
| *G09B 7/02* | (2006.01) | |
| *G06F 16/951* | (2019.01) | |
| *G06F 40/35* | (2020.01) | |
| *G06Q 50/20* | (2012.01) | |
| *G06Q 50/00* | (2012.01) | |

(Continued)

(52) U.S. Cl.
CPC ....... *G06Q 30/0217* (2013.01); *G06F 16/951* (2019.01); *G06N 20/00* (2019.01); *G09B 7/02* (2013.01); *H04L 67/02* (2013.01); *H04L 67/26* (2013.01); *G06F 40/35* (2020.01); *G06Q 10/10* (2013.01); *G06Q 50/00* (2013.01); *G06Q 50/10* (2013.01); *G06Q 50/20* (2013.01)

(58) Field of Classification Search
CPC .... G06Q 30/0217; G06Q 50/20; G06Q 50/00; G06Q 50/10; G06Q 10/10; G06F 16/951; G06F 40/35; G06F 17/30; G06N 20/00; H04L 67/02; H04L 67/26; G09B 7/02
See application file for complete search history.

(56) References Cited

U.S. PATENT DOCUMENTS

| | | | |
|---|---|---|---|
| 2018/0032997 A1* | 2/2018 | Gordon | G06Q 30/0269 |
| 2019/0204907 A1* | 7/2019 | Xie | A63F 13/424 |
| 2021/0042830 A1* | 2/2021 | Burke | G06Q 20/341 |

FOREIGN PATENT DOCUMENTS

| | | |
|---|---|---|
| KR | 1020020010226 A | 2/2002 |
| KR | 1020060068884 A | 6/2006 |

(Continued)

*Primary Examiner* — Quoc A Tran
(74) *Attorney, Agent, or Firm* — Nicholas Park

(57) ABSTRACT

A present invention relates to an operating method of a system for providing an intelligent home education big data platform according to an embodiment comprises collecting questions about home education input through a mobile device, analyzing the collected questions into at least one question pattern, comparing the analyzed question pattern with a pre-stored big data, determining whether answer information corresponding to the question pattern is recorded in the pre-stored big data, generating survey result information by performing survey corresponding to the question pattern by pre-registered member, generating expert mentoring information corresponding to the question pattern by experts employed by an operator, replying the generated crawling information, survey result information, or the generated expert mentoring information to the mobile device, and matching the generated crawling information, or the generated expert mentoring information with the collected questions to process to be learned to the big data.

2 Claims, 5 Drawing Sheets

(51) Int. Cl.
*G06Q 10/10* (2012.01)
*G06Q 50/10* (2012.01)
*G06F 17/00* (2019.01)

(56) References Cited

FOREIGN PATENT DOCUMENTS

| KR | 1020120087412 A | 8/2012 |
| KR | 1020190125265 A | 11/2019 |

* cited by examiner

SYSTEM FOR PROVIDING ARTIFICIAL INTELLIGENT HOME EDUCATION BIG DATA PLATFORM BY USING SAMPLING METHOD BASED ON MOBILE DEVICE AND THE OPERATING METHOD OF THE SAME

CROSS-REFERENCE TO RELATED APPLICATION

This application claims priority to and the benefit of Korean Patent Application No. 10-2020-0018391 filed on Feb. 14, 2020, the disclosure of which is incorporated herein by reference in its entirety.

BACKGROUND

1. Field of the Invention—Technical Field

The present invention relates to a technology for providing an intelligent home education big data platform, and more specifically, to an inventive concept of providing a customized solution related to home education to a user using the latest artificial intelligence technology.

2. Discussion of Related Art

Demands for mentoring on children are increasing day by day from a point of view that a basis of children's behavior is from their parents, so that they can upbring them into excellent children in a complex modern civilization.

Grandparents has an important effect on family education when grandparents live together, but in small families, family education is mainly conducted between parents and children. Children learn the rules and values necessary for common life through family education, such as a role of family members, the big and small rules of human life, the purpose of life, social ideals, and basic attitudes toward important tasks in life such as marriage or job. However, these are evaluated as more significantly than any education in that they become the basis of life.

The home education was conducted around Confucian rules in traditional Korean families, but the recent small family tends to emphasize modern virtues such as independence and an excellent academic performance.

The education about children's academic achievements is also showing a lot of interest in addition to Confucian rules. To this end, it is possible to acquire relevant information by expert mentoring to improve academic performance, books providing know-how of experienced seniors, or answers from intellectuals.

SUMMARY OF THE INVENTION

An object of the present invention is to provide an inventive concept of providing home education information appropriate to individual preferences at a right time and in a right place by artificial intelligence learned by various methods such as crawling information, expert mentoring, and surveys.

The present invention includes analyzing a user's question with artificial intelligence, determining whether to perform at least one or more operations when there is no pre-learned big data among surveys, crawling, and expert mentoring, and its purpose is to provide the user with optimized answer information based on the result of the performance of the determined operation.

The object of the present invention is to automatically provide a customized push service at the right time and in the right place to the user based on the result of the survey, the crawling, and the expert mentoring and a machine learning result of information, and the user's personal information.

The object of the present invention is to provide benefits (discount on mobile device and benefits on mobile bill, etc.) according to response performance to a plurality of users.

According to an aspect of the inventive concept, there is provided a method of the system providing intelligent home education big data platform, the system comprises a processor operating at least one of a computer program, a code and an instruction, the method comprising: collecting, by a collector operated by the processor, questions about home education received from a mobile device; analyzing, by an analyzer operated by the processor, the collected questions into at least one question pattern; comparing, by a determiner operated by the processor, a pre-stored big data with the question pattern; determining, by the determiner operated by the processor, whether an answer information corresponding to the question pattern is recorded in the pre-stored big data; reading, by an information generator operated by the processor, the answer information from the pre-stored big data, when the answer information is recorded in the pre-stored big data as the result of the determination; generating, by the processor, a crawling information by performing additional crawling when the corresponding answer information is not recorded as the result of the determination; generating, by the processor, a survey result information by performing a survey corresponding to the question pattern on pre-registered members; generating, by the processor, an expert mentoring information corresponding to the question pattern received from experts; replying, by a reply module operated by the processor, to the mobile device by reading a push information and the answer information generated by combining at least one of the survey result information, the expert mentoring information, the crawling information and a learning information generated by using a big data information that is previously learned; matching by an update module operated by the processor, the crawling information, the survey result information, or the expert mentoring information to the collected questions to be learned by the big data; inquiring, by the processor, members regarding an intention to join the supporter when the members signing up for a membership, and controlling, by the processor, the mobile device of the members expressing the intention to join the supporter to automatically install an application from central server; using, by the processor, information of individual supporter, personality of the supporter, preference of the supporter and a family of the supporter from supporters by the application as basic data and a pattern grouping information for future survey target selection and push service; and receiving, by the processor, a personal information from a questioner through the mobile device; wherein the receiving personal information from the questioner may comprise, receiving a mandatory input of a child information when the questioner is the parent; receiving a mandatory input of a parental information when the questioner is the child; inferring, by the processor, home education needs of the member based on previously collected member information, regardless of the question input through the mobile device; reading, by the processor, a needs information by searching a big data that pre-learned for the home education needs, and providing the needs information to the member through the mobile device by a push alarm; generating, by the processor, the needs information by combining and analyzing at least one of the crawling information, the survey result information, and the expert mentoring information when there is no needs information read from the big data, and providing the needs information to the mobile device by the push alarm; and providing, by the processor, benefits for discounts on mobile device and benefits on mobile bill to new member registering to the mobile device or existing member who participate as supporters, input the question or respond to the survey based on their activity performance; wherein, the generating, by the processor, a survey result information by performing a survey corresponding to the question pattern on pre-registered members, may comprise, analyzing the question pattern to determine a survey target group; setting survey questions for the survey target group; performing the survey based on the survey questions; and generating the survey result information from survey performance, wherein, the analyzer analyzes the subject of the question is the parent or the child, in the analyzing the collected question as at least one question pattern, wherein, the information generator generates the crawling information and the expert mentoring information in consideration of the subject of the question, when performing the additional crawling, if the collected question is the question not requiring the professional answer, generates the survey result information by the supporters in consideration of the subject of the question.

According to another aspect of the inventive concept, there is provided a system for providing an intelligent home education big data platform comprising a processor operating at least one of a computer program, a code, and an instruction, the system comprising: a collector collects questions about home education input by a mobile device; an analyzer analyzes the collected questions into at least one question pattern; a determiner determines whether an answer information corresponding to the question pattern is recorded in a pre-stored big data and compares the analyzed question pattern with pre-stored big data; an information generator generates an expert mentoring information corresponding to the question pattern received from experts, or generates a survey result information by performing the survey corresponding to the question pattern on pre-registered members, generates a crawling information by performing additional crawling when the answer information is not recorded as the result of the determination of the determiner, and reads the answer information from the pre-stored big data, when the answer information is recorded in the pre-stored big data as the result of the determination of the determiner; a reply module replies the crawling information, the survey result information, or the expert mentoring information to the mobile device; and an update module matches the survey result information, the expert mentoring information or the crawling information to the collected questions to be learned by the big data; and wherein, the processor inquires the members regarding an intention to join the supporter, controls the mobile device of the members expressing the intention to join the supporter to automatically install an application from central server, uses information of individual supporter, personality of the supporter, preference of the supporter and a family of the supporter from supporters by the application as basic data and a pattern grouping information for future survey target selection and push service, includes the step of receiving a personal information from a questioner through the mobile device, receives the mandatory input of a parental information when the questioner is the child, receives the mandatory input of a child information when the client is the parent, infers the home education needs of the member based on the previously collected member information regardless of the question input through the mobile device, reads a needs information by searching for a big data that pre-learned for the home education needs, provides the needs information to members through the mobile device by a push alarm, and generates the needs information by combining and analyzing at least one of the crawling information, the survey result information, and the expert mentoring information when there is no needs information read from the big data, provides the needs information to the mobile device by the push alarm, and provides benefits for discounts on mobile device and benefits on mobile bill to new member registering to the mobile device or existing member who participate as supporters, input the question or respond to the survey based on their activity performance, wherein, the information generator performs the survey corresponding to the question pattern to generate a survey information, analyzes the question pattern to determine the survey target group, sets survey questions for the survey target group, performs the survey based on the survey questions, and generates the survey information from survey performance, wherein, the analyzer analyzes the subject of the question is the parent or the child, wherein the information generator generates the crawling information and the expert mentoring information in consideration of the subject of the question, when performing the additional crawling, if the collected question is the question not requiring the professional answer, generates the survey result information by the supporters in consideration of the subject of the question.

DETAILED DESCRIPTION

Figure 1:
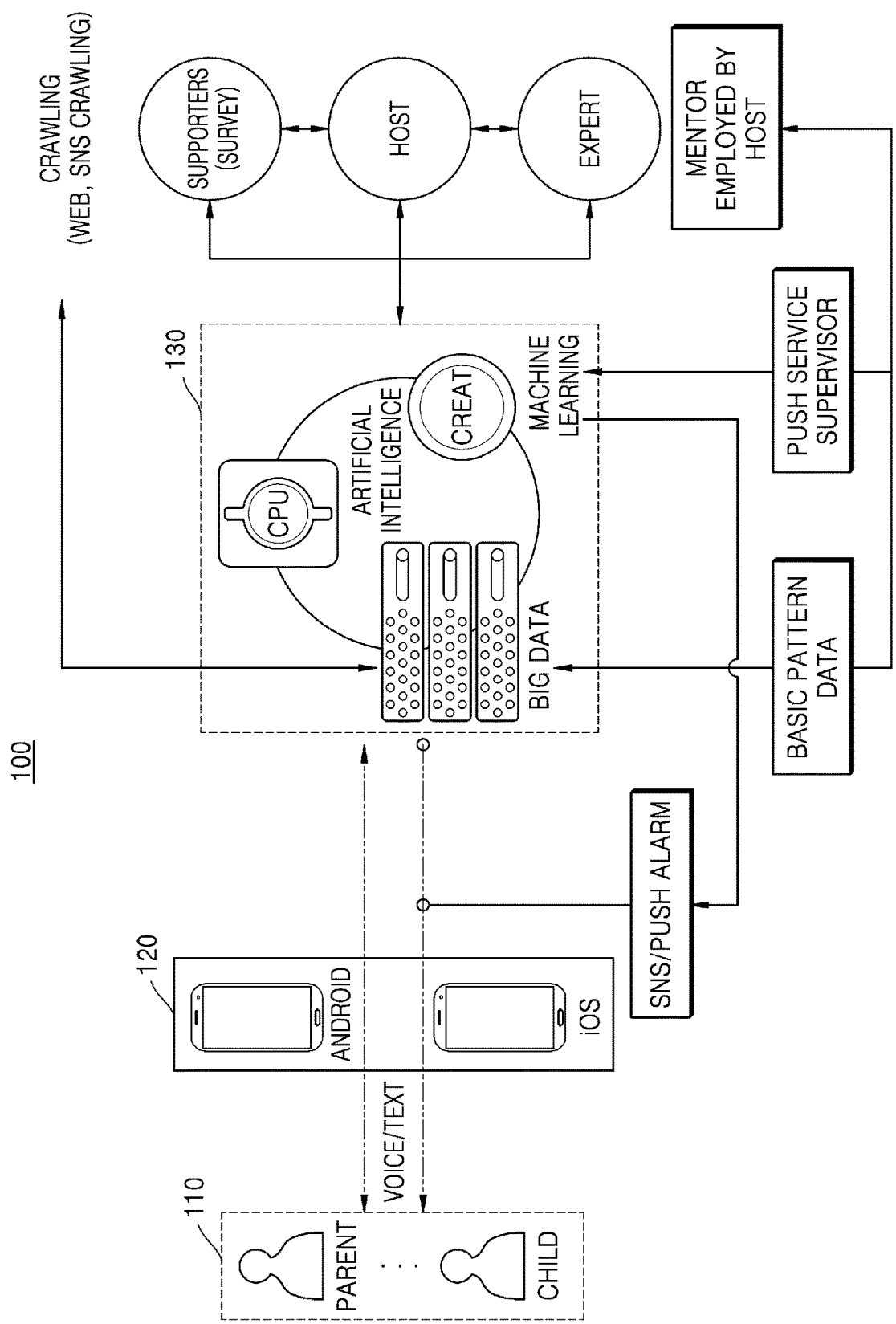
FIG. 1 is a diagram illustrating a structure of a system to which an intelligent home education big data platform according to an embodiment is applied.

These specific structural or functional descriptions of embodiments according to an inventive concept of a present invention disclosed in a present specification are exemplified only for a purpose of describing embodiments according to the inventive concept of the present invention, and they may be implemented in various forms and are not limited to the embodiments described herein.

Since the embodiments according to the inventive concept of the present invention can apply various changes and have various forms, the embodiments will be illustrated in the drawings and described in detail herein. However, this is not intended to limit the embodiments according to the concept of the present invention to specific disclosed forms, and comprises changes, equivalents, or substitutes comprised in the concept an inventive scope of the present invention.

Terms such as first or second may be used to describe various elements, but the components should not be limited by the terms. The components are only for the purpose of distinguishing one component from other components, for example, without departing from the scope of the rights according to the concept of the present invention, the first component may be referred to as the second component. Similarly, the second component may also be referred to as the first component.

When the component is referred to as being "connected" or "connected" to another component, it is understood that it may be directly connected or connected to the other component, but other components may exist in the middle. On the other hand, when a component is referred to as being "directly connected" or "directly connected" to another component, it should be understood that there is no other component in the middle. Expressions describing the relationship between components, for example, "between" and "right between" or "directly adjacent to" should be interpreted as well.

The terms used in the present specification are only used to describe specific embodiments not intending to limit the present invention. Singular expressions comprise plural expressions unless the context clearly indicates otherwise. Terms such as "comprise" or "have" in the present specification, are intended to designate the existence of the specified features, numbers, steps, operations, components, parts, or a combination thereof, and it is to be understood that the possibility of existence or the addition of one or more other features or numbers, steps, actions, elements, parts, or combinations thereof is not preliminarily excluded.

All terms used herein including technical or scientific terms, unless otherwise defined, have the same meaning as commonly understood by one of ordinary skill in the art in the technical field to which the present invention belongs. Terms such as those defined in commonly used dictionaries have meanings consistent with the meanings of the related technology. It should not be interpreted in an ideal or excessively formal sense unless explicitly defined in the specification.

Hereinafter, embodiments will be described in detail with reference to the accompanying drawings. However, the scope of the patent application is not limited or limited by these embodiments. The same reference numerals in each drawing indicate the same member.

FIG. 1 is a diagram illustrating the structure of the entire system 100 providing intelligent home education big data platform according to an embodiment.

The entire system 100 providing intelligent home education big data platform according to an embodiment may provide home education information suitable to individual preference at a right time and in a right place by artificial intelligence learned by various methods such as crawling information, expert mentoring, and surveys. In addition, it is possible to determine whether to perform at least one operation among surveys, crawling, and expert mentoring by analyzing an user's question with artificial intelligence, and provide an optimized solution to the user based on the result of the performance of the determined operation. In the specification, learning by big data or learning on big data may refer to artificial intelligence is learned using the big data. And learning method may comprise machine learning algorithm and deep learning algorithm, such as Convolutional Neural Network(CNN), Recurrent Neural Network (RNN).

To this end, the entire system 100 providing intelligent home education big data platform according to an embodiment may receive various questions from a questioner 110 that may be interpreted as a parent or child.

The questioner 110 needs to provide additional personal information and updates of himself or herself by supporters membership registration along with the question even if basic personal data are entered, in order to ensure the latest and accurate data. Personal information may include information of individual supporter (i.e. address, name, gender), personality of the supporter (i.e. positive/negative, aggressive/passive), preference of the supporter (i.e. likes and dislikes) and a family of the supporter, and may be used when building big data for future questions or answers, or as basic data for an appropriate push service.

Parents or children may input the question by various means that can be input through a mobile device, and may input the question in the form of, for example, voice or text.

In FIG. 1, only parents and children are displayed as examples of the questioner 110, but the inventive concept may be applied in various ways, such as grandparents, teachers, relatives, and acquaintances of the child.

This specification, for convenience of explanation, explains a case where the questioner 110 is the parent or the child will be described.

First of all, parents ask questions about their children's education, such as 'What is good food to eat the day before the school exam?', 'What is a good hobby to share with your adolescent daughter?' and input questions to the mobile device 120 relating to matters that can be supported for a nice home education.

In addition, children can ask questions by inputting their own education and direct questions into the mobile device 120, such as 'how to cope with an unknown problem when taking an exam' and ' recommendation for US drama for good English study'.

The mobile device 120 may be interpreted as a wired/wireless device capable of communication such as a smart phone, a tablet, or a computer device, and may be interpreted as the portable mobile wireless communication device (smart phone) in this specification.

The operating system of the mobile device 120 of FIG. 1 is divided into the device adopting an Android method and a device adopting iOS, which are currently mainly used. However, various operating systems may be installed and operated according to the system development situation.

The question input to the mobile device 120 is input to the system 130 providing intelligent home education big data platform and may be used for analysis based on artificial intelligence.

The system 130 providing intelligent home education big data platform can update big data by machine learning or read the answer based on artificial intelligence to reply to the input question configured to process an analysis based on artificial intelligence.

For example, the system 130 providing intelligent home education big data platform may analyze the input question and determine whether the question can be answered by learned big data. If it is a question that cannot be answered by learned big data, it may be operated to answer the question by preparing the answer by crawling, surveys or the expert.

To this end, a basic pattern data may be recorded in the big data, and the big data may be continuously learned by machine learning. For example, when the content of the question is a question about mathematics, it may correspond to a pattern using 'mathematics' as indexing.

In addition, in the case of the question related to 'how to be good at math', the question may be identified as the question of patterns such as 'mathematics', 'learning method', and 'problem solving know-how'.

The answers related to each basic pattern data as the index may be recorded. Accordingly, the answer that satisfies all three patterns of 'mathematics', 'learning method', and 'problem solving know-how' may be selected as the answer to the questioner's question.

The answers recorded in big data may be answers to previous questions. In particular, it may be at least one of survey result information generated by performing the survey on the pre-input question, expert mentoring information generated by the expert, and crawling information. In the specification, the expert mentoring information may refer to answers generated by the expert at the question field, for example, the expert may include teachers, professors or someone have doctoral degree at certain field. And in the specification, the crawling information may refer to information generated by crawling, and the crawling may refer to systematically browsing the internet to find information.

In other words, the answer provided to the questioner generated by crawling, supporter survey, or expert mentoring is learned and recorded in big data on the intelligent home education big data platform. At this time, the satisfaction level of the answer from the questioner may be fed back, and the answer may be weighted and recorded according to the level of the feedback.

If the basic pattern data related to the question is not recorded in the big data, the system 130 may prepare the answer based on artificial intelligence.

Specifically, the system 130 may extract a question pattern analyzed from a question and generate survey result information by performing the survey based on the extracted question pattern. In addition, the system 130 may generate crawling information or expert mentoring information corresponding to the question pattern requiring more professional answers than the survey. In the specification, the survey result information may refer to information generated by performing survey to the members.

For example, if the question pattern includes the pattern that requires the professional answer, such as education, psychology, children, health, career, etc., the system 130 may provide the analysis pattern to the expert group or crawling algorithm to generate expert mentoring information or crawling information corresponding to the question pattern.

If the question pattern corresponds to the non-professional field such as the study know-how of seniors, the system 130 may generate survey result information by performing the survey corresponding to the question pattern by supporters registered in advance.

The supporters registered in advance may be new member or existed member who join mobile device service, and who participate as supporters, input questions, or respond to surveys.

The system 130 may analyze the question pattern to determine the survey target group, set survey questions for the survey target group, and perform the survey by using the survey questions to generate survey information. The survey target group may be pre-determined by the system 130 among the members.

The operator may provide the mobile device discount or benefits on mobile bill in order to activate the question or answer for the member participating in the question or answer as a compensation.

The system 130 may provide pre-learned big data information at the right time and in the right place by push alarm to the members according to the needs of members, regardless of the question input through the mobile device. In the specification, the big data information may refer to the information generated by pre-learned big data. And if the learned big data information is insufficient, the optimized push alarm may be provided by additional crawling, or by creating and combining survey, or expert mentoring information. At this time, the expert group should appropriately control the system 130 when necessary for the optimization on the push alarm. In the specification, the push information may refer to the information that send with push alarm.

In one example, The system 130 may automatically provide the customized push alarm according to the user's needs, based on the result of machine learning that analyzes surveys, crawling, and expert mentoring, and on the user's personal information. For example, the system 130 may infer the home education needs of the member based on the member information collected in advance regardless of the question input through the mobile device, and search pre-learned big data about inferred home education needs to read the needs information, and provide the needs information to the member by the push alarm through the mobile device. In the specification, learning information may refer to the information that is used to learn by the big data.

The needs information may be the information generated by member information pre-collected in advance and may be read using the inferred home education needs.

If there is no needs information read out from the big data, at least one of crawling information, survey result information and expert mentoring information may be generated, combined and analyzed to provide the optimized needs information for personalized home education service to the mobile device by the push alarm.

The system 130 providing intelligent home education big data platform provides customized home education-related information by an automatic information guidance system and SNS, as differentiated, customized information according to individual preference such as growth cycle, home environment, personality, and school grades.

Figure 2:
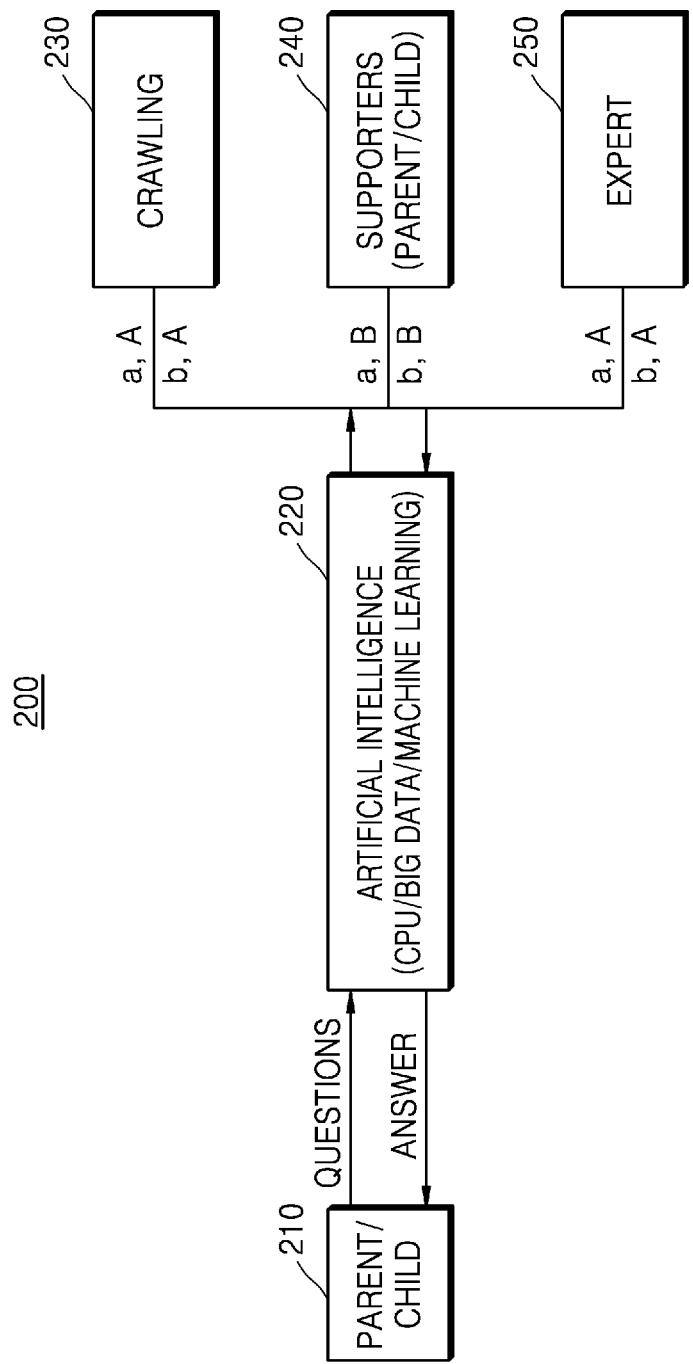
FIG. 2 is the diagram for explaining a processing procedure from inquiry to an answer.

FIG. 2 is the diagram for explaining the processing procedure 200 from the question request to the answer.

According to FIG. 2, The parent or child 210 may input the question to the system 220 providing home education big data platform using the mobile device as shown in FIG. 2. At this time, the system 220 may analyze the question to extract the question pattern and may analyze the question pattern from the extracted question pattern based on artificial intelligence.

The system 220 may perform at least one of crawling, supporter survey, and expert mentoring based on the analyzed question pattern.

The system 220 may analyze whether the collected question is the question input from the parent or the question input from the child to analyze the question pattern. In addition, it may be determined whether the collected question is the question requiring the professional answer, and whether readable information according to the collected question is recorded on big data by crawling in real time. And if the readable information is not recorded in big data, it can be determined whether to perform additional crawling or not.

The analysis and determination on these question patterns may be performed in a specific order, or the next process may proceed after the analysis and determination are all made in random order.

The system 220 may determine whether there is similar question or answer data in big data, and if so, the system 220 may read the corresponding data from big data and respond immediately. In addition, if there is no similar question or answer data in the big data, the question pattern may be determined.

The system 220 may select different survey methods and survey target according to the question pattern determination.

'a', 'b', 'A' and 'B' shown in FIG. 2 are identifiers for grouping the questioner or the expert of the answer to determine a question pattern and are used again in the description of FIG. 4 below.

For example, the system 220 may select among the crawling 230, the supporters survey 240, or the expert mentoring 250 by determining the question pattern.

For example, if the analyzed question is additional information that can be read by crawling, the answer to the question may be read and provided by the crawling 230.

If the analyzed question pattern is determined by the supporters 240, that is, when it is determined to prepare the answer by the supporters' survey, supporters whose environment, grades, and personality are most similar to those of the questioner (or the person receiving home education) may be selected as the target of the survey, and the survey will be filled out and performed and the survey result information will be generated based on the content of the survey.

In addition, if it is determined that the analyzed question pattern requires mentoring of the expert 250, the system 220 may prepare the answer by requesting the answer according to the question from the expert and reply to the questioner (parent or child 210).

Figure 3:
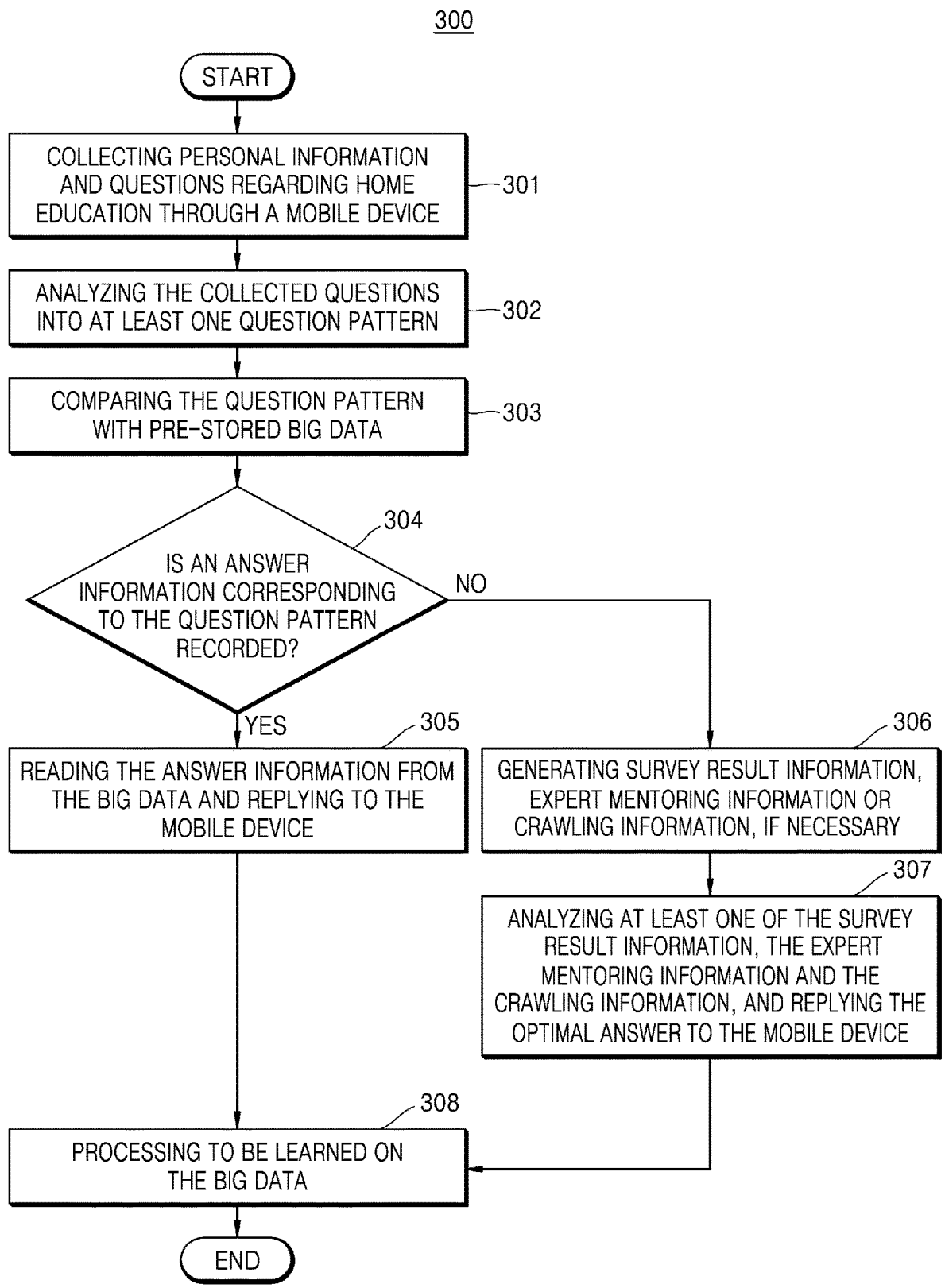
FIG. 3 is a flowchart illustrating the operating method of system for providing the intelligent home education big data platform according to the embodiment.

FIG. 3 is a flowchart 300 illustrating the operating method of system for providing the intelligent home education big data platform according to the embodiment.

The operating method of system for providing the intelligent home education big data platform according to the embodiment may collect questions and personal information about home education through the mobile device (step 301). For example, the operating method of system for providing an intelligent home education big data platform may distinguish the questioner into the existing registered member (supporters) or non-member, increase the accuracy of the pre-input supporter personal information, receive the personal information of the questioner through the mobile device by the push alarm according the needs of users (parents or children) to update the personal information. In particular, if the questioner is the parent, the child information may be required, and if the questioner is the child, parent information may be required.

Next, the operating method of system for providing the intelligent home education big data platform may include analyzing the collected questions and analyze them as at least one question pattern (step 302).

The operating method of system for providing the intelligent home education big data platform may include comparing the analyzed question pattern with the pre-stored big data (step 303) and determining whether answer information corresponding to the question pattern is recorded in the pre-stored big data (step 304).

As a result of the determination, when the corresponding answer information is recorded, the operating method of system for providing the intelligent home education big data platform may include reading the answer information from the big data and replying to the mobile device (step 305).

As the result of the determination in step 304, when the corresponding answer information is not recorded, the answer information may be generated by crawling, and the survey result information may be generated by performing the survey corresponding to the question pattern by members who have been registered in advance, or the expert mentoring information may be generated corresponding to the question pattern by an expert employed by the operator. (step 306)

For example, to generate the survey result information by performing the survey corresponding to the question pattern, the survey target group may be determined by analyzing the question pattern. In addition, by generating the survey information with survey question set for the survey target group, the content of the question may be changed to the survey content, and the survey may be performed using the survey information.

The example of determining whether to perform additional crawling, to generate the survey information, or to generate expert mentoring information by analyzing the question pattern will be described in more detail with reference to FIG. 4 below.

Thereafter, the method of providing the intelligent home education big data platform may return the most appropriate answer to the mobile device by comprehensively analyzing the generated crawling information, the generated survey result information, or the generated expert mentoring information (step 307).

The intelligent home education big data platform provision method, as the example, generates the optimized answer and replies to the mobile device by combining at least some of the pre-learned big data information as well as the survey result information generated in real time, the generated expert mentoring information, or the generated crawling information.

In addition, the operating method of system for providing the intelligent home education big data platform may match the collected question with the survey result information or the expert mentoring information and the crawling information and may be processed to learn in big data (step 308).

In an embodiment, the operating method of system for providing the intelligent home education big data platform may inquire about the intention of joining the supporter. In addition, for members expressing their intention to sign up as the supporter, it may receive and use personal information such as information of individual supporter, personality of the supporter, preference of the supporter and a family of the supporter as the pattern grouping information and basic data through the application, which is automatically installed on the mobile device of the supporter, for smooth survey and push service in the future from a central server such as Android server or IOS server.

Meanwhile, in an embodiment, the operating method of system for providing the intelligent home education big data platform may comprise generating and providing the answer regardless of the question by the customized push alarm through the mobile device. To this end, the operating method of system for providing the intelligent home education big data platform may comprise inferring the home education needs of the members based on the member information collected in advance and reading the needs information from the pre-learned big data for the inferred home education needs to provide it to members by the push alarm through the mobile device. When there is no needs information read out from the big data, the needs information can be provided by generating, combining and analyzing at least one of the crawling information, the survey result information, and the expert mentoring information by the push alarm.

In an embodiment, the operating method of system for providing the intelligent home education big data platform may comprise providing the discount on mobile device or benefits on mobile bill to the member who inputs the question or responds to the survey based on the activity performance.

Figure 4:
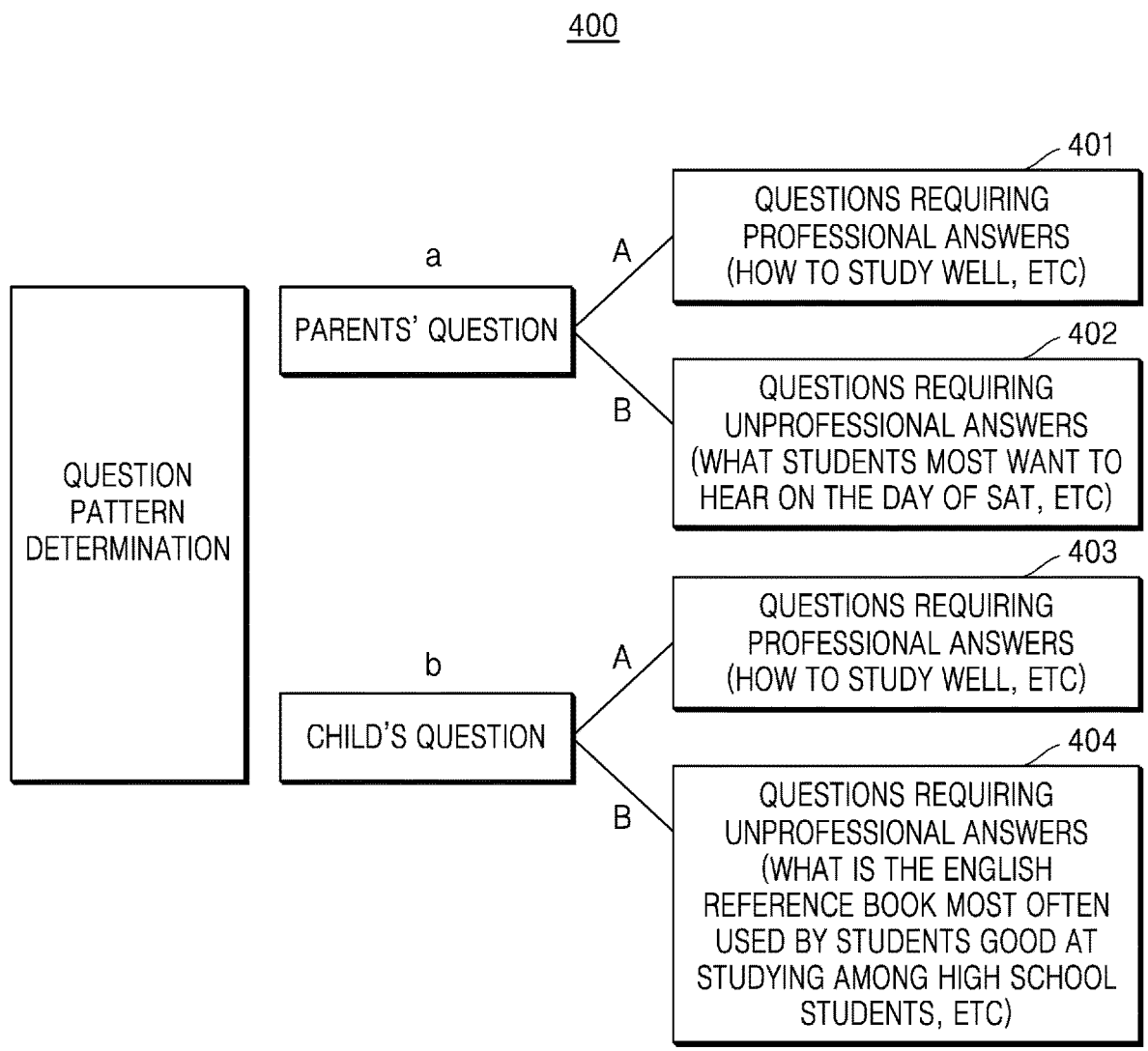
FIG. 4 is the diagram illustrating a process of determining a question pattern according to the embodiment.

FIG. 4 is the diagram illustrating the process 400 of determining the question pattern according to the embodiment.

The mobile device may receive questions about home education through the installed application.

The operating method of system for providing the intelligent home education big data platform may comprise analyzing the collected question such as classifying the collected question into at least one question pattern, when collecting the inputted question of home education.

The collected questions may be analyzed as at least one question pattern by the first step of analyzing whether the collected question is the question input from the parent or the child, the second step of determining whether the collected question is the question requiring professional answers, and the third step of determining whether additional crawling is necessary because the updated data does not exist in big data by real-time crawling.

The collected question may be classified as the case where the questioner is the parent and the case where the questioner is the child by looking at the determination process 400 for analyzing at least one question pattern.

When the parent asks the question, the question may be classified as 'a', and when the child asks the question, the question may be classified as 'b', for example, as shown by reference numeral.

The operating method of system for providing the intelligent home education big data platform may comprise determining whether the collected question is the question requiring the professional answer or not in the second step. In other words, the operating method may comprise determining whether the question requires the professional answer or the non-professional answer.

The question requiring the professional answer can be identified as 'A', and the question with the non-professional answer can be identified as 'B' regardless of the questioner of each question.

If the questioner is the parent, in the case of the question 401 requiring the professional answer, the question pattern can be distinguished by the pattern of 'a' and 'A', and the question pattern may be distinguished by patterns of 'a' & 'B' if the question 402 is with the unprofessional answer in the situation where the questioner is the parent.

For example, for the question requiring the professional answer such as 'how to study well', the expert mentoring information may be asked. And in case of the questions requiring unprofessional answers such as 'what students most want to hear on the day of SAT', the answer from experience rather than the professional answer may be required.

Even if the questioner is the child, in the case of the question 403 requiring the professional answer, the question pattern can be distinguished by the pattern of 'b' & 'A', and when the questioner is the question 404 requiring the unprofessional answer in the situation where the questioner is the child, the question pattern may be distinguished by the pattern of 'b' &'B'.

Similarly, the questions requiring the professional answers such as 'how to study well', the expert mentoring information may be asked. And in case of the questions requiring unprofessional answers such as 'the English reference book most often viewed by students good at studying among high school students', the answer from experience rather than the professional answer may be required.

The first to third steps described above may be performed in order but may be performed in no particular order.

According to FIG. 2 described above, the questions 401 and 403 may prepare for answers by crawling 230 or expert mentoring 250. In addition, the questions 402 and 404 may prepare for answers by the supporters 240.

For example, when the collected question is the question requiring the professional answer as the result of the determination in the second step, and when there is no updated data in big data by real-time crawling so that additional crawling is necessary as the result of the determination in the third step, the crawling and expert mentoring may be performed in consideration of the subject of the question (parent or child) analyzed in the first step.

As another example, when the collected question is the question not requiring the professional answer as a result of the determination in the second step, the supporter survey may be performed in consideration of the subject of the question (parent or child) analyzed in the first step.

As another example, when the collected question is the question requiring the professional answer as the result of the determination in the second step, and when there is updated data in big data by real-time crawling so that no additional crawling is required as the result of the determination in the third step, the procedure for performing expert mentoring may be performed in consideration of the subject of the question (parent or child).

According to an embodiment, when the question input from parents, the supporter survey with parents as a survey group may be conducted, and when the question input from the child, the supporter survey with children as the survey group may be conducted. On the contrary, when the question input from parents, the supporter survey with children as the survey group may be conducted, and when the question input from children, the supporter survey with parents as the survey group may be conducted.

Figure 5:
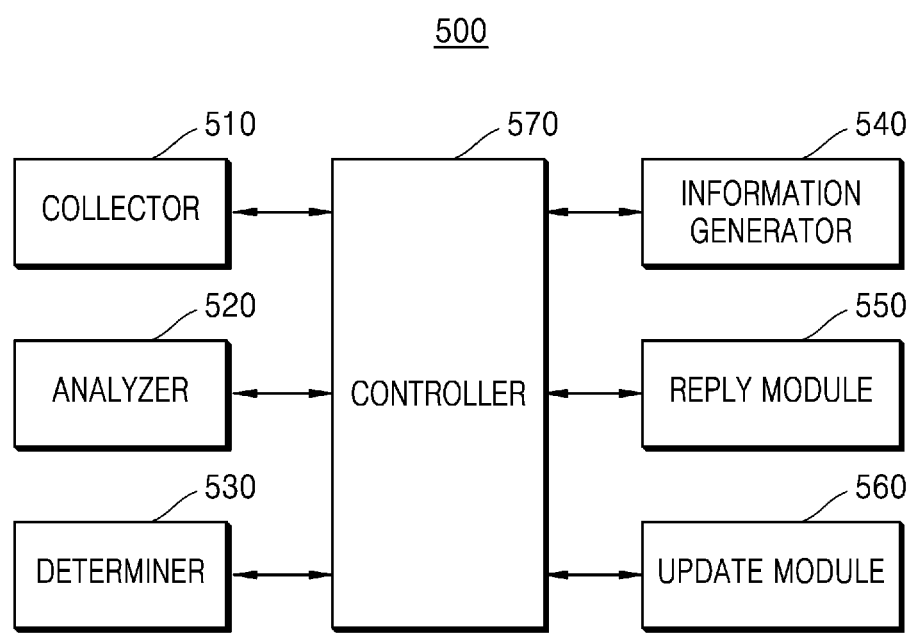
FIG. 5 is the diagram illustrating the system for providing the intelligent home education big data platform according to the embodiment.

FIG. 5 is the diagram illustrating the system 500 for providing the intelligent home education big data platform according to an embodiment.

The system 500 for providing the intelligent home education big data platform according to an embodiment may provide home education information suitable to each individual's preference at the right time and in the right place by artificial intelligence learned by various methods such as crawling information, expert mentoring, and surveys. In addition, the system 500 may determine whether to perform at least one of survey, crawling, and expert mentoring by analyzing the user's question with artificial intelligence, and the optimized answer information may be provided to the user based on the result of the determined operation.

The system 500 may comprise a collector 510, an analyzer 520, a determiner 530, an information generator 540, a reply module 550, and an update module 560.

First, the collector 510 according to an embodiment may collect questions for home education input through the mobile device.

Next, the analyzer 520 may analyze the collected question and analyze it as at least one or more question patterns.

The determiner 530 may compare the analyzed question pattern with pre-stored big data to determine whether answer information corresponding to the question pattern is recorded in the pre-stored big data.

As the result of the determination by the determiner 530, the information generator 540 may read the answer information from big data when corresponding answer information is recorded. When the corresponding answer information is not recorded, the information generator 530 may generate the information by crawling, or the survey result information by performing the survey corresponding to the question pattern by pre-registered members. In addition, the information generator 520 may generate the expert mentoring information corresponding to the question pattern by the expert employed by the operator.

The reply module 550 may process the generated survey result information, the generated expert mentoring information, or the crawling information to be replied to the mobile device.

As the example, the reply module 550 may provide optimized and customized information generated based on at least one of the survey result information, the expert mentoring information and the crawling information to the mobile device by the push alarm, regardless of the question input through the mobile device. Thus, it is possible to generate and provide the information customized and optimized for user needs.

In addition, the update module 560 may match the survey result information, the expert mentoring information, the crawling information, and the needs information to the collected questions to be learned in big data.

The controller 570 shown in FIG. 5 can be interpreted as the processor, an arithmetic logic unit (ALU), a digital signal processor, a central processing unit (CPU), a graphic processing unit (GPU), etc., Each element may be responsible for functions such as delivering a pre-coded command according to a specific event or controlling communication between components.

The home education information suitable to individual preferences can be provided at the right time and in the right place by artificial intelligence learned by various methods such as crawling information, expert mentoring, and survey, after all, when using the present invention.

In addition, the user's question may be analyzed with artificial intelligence to determine whether to perform at least one operation among survey, crawling, and expert mentoring. And the optimized answer information may be provided to the user based on the result of the determined operation, and the user-customized push service may be provided based on the result of machine learning according to survey, crawling, and expert mentoring, and the user's personal information. In addition, the benefits such as mobile device discount or benefits on mobile bill may be provided according to response performance to a plurality of users.

The apparatus described above may be implemented as the hardware component, the software component, and/or the combination of the hardware component and the software component. For example, the devices and components described in the embodiments comprise, for example, the processor, a controller, an arithmetic logic unit (ALU), a digital signal processor, a microcomputer, a field programmable array (FPA), programmable logic unit (PLU), microprocessor or any other device capable of performing and responding to instructions, can be implemented using one or more general purpose computers or special purpose computers. The processing device may perform an operating system (OS) and one or more software applications performed on the operating system. In addition, the processing device may access, store, manipulate, process, and generate data in response to the performance of software. Although it is sometimes described that one processing device is used for convenience of understanding, those of ordinary skill in the art will appreciate that the processing device may include the plurality of processing elements and/or the plurality of types of processing elements. For example, the processing device may include the plurality of processors or one processor and one controller. In addition, other processing configuration is possible such as a parallel processor.

The software may comprise a computer program, a code, instructions, or a combination of one or more of these, the processing device may be configured to be operated as desired or ordered it to be operated independently or collectively. Software and/or data may be interpreted by the processing device or to provide instructions or data to the processing device, or it can be permanently or temporarily embodied in any type of machine, component, physical device, virtual equipment, computer storage medium or device, or signal wave being transmitted. The software may be distributed over networked computer systems and stored or performed in the distributed manner. Software and data may be stored on one or more computer-readable recording media.

The method according to the embodiment may be implemented in the form of program instructions that can be performed by various computer means and recorded in the computer-readable medium. The computer-readable medium may comprise program instructions, data files, data structures, etc. alone or in combination. The program instructions recorded on the medium may be specially designed and configured for the embodiment or may be known and usable to those skilled in computer software. Examples of computer-readable recording media comprise magnetic media such as hard disks and floppy disks and magnetic tapes, and optical media such as CD-ROMs, DVDs, and magnetoptical media such as floptical disks, the hardware device specially configured to store and perform program instructions such as ROM, RAM, flash memory, and the like. Examples of program instructions comprise not only machine language codes such as those produced by a compiler but also high-level language codes that can be performed by the computer using an interpreter or the like. The hardware device described above may be configured to operate as one or more software modules to perform the operation of the embodiment, and vice versa.

Although the embodiments have been described by the limited drawings as described above, various modifications and variations are possible from the above description to those of ordinary skill in the art. For example, although the described techniques are performed in the different order from the described method, and/or components such as systems, structures, devices, circuits, etc. are combined or combined in the different form from the described method or are substituted or replaced by other components or equivalents, the appropriate results may be achieved.

Therefore, other implementations, other embodiments, and those equivalents to the claims also belong to the scope of the claims to be described later.

What is claimed is:

1. A method of the system providing intelligent home education big data platform, the system comprises a processor operating at least one of a computer program, a code and an instruction, the method comprising:
   collecting, by a collector operated by the processor, questions about home education received from a mobile device;
   analyzing, by an analyzer operated by the processor, the collected questions into at least one question pattern;
   comparing, by a determiner operated by the processor, a pre-stored big data with the question pattern;
   determining, by the determiner operated by the processor, whether an answer information corresponding to the question pattern is recorded in the pre-stored big data;

reading, by an information generator operated by the processor, the answer information from the pre-stored big data, when the answer information is recorded in the pre-stored big data as the result of the determination;

generating, by the processor, a crawling information by performing additional crawling when the corresponding answer information is not recorded as the result of the determination;

generating, by the processor, a survey result information by performing a survey corresponding to the question pattern on pre-registered members;

generating, by the processor, an expert mentoring information corresponding to the question pattern received from experts;

replying, by a reply module operated by the processor, to the mobile device by reading a push information and the answer information generated by combining at least one of the survey result information, the expert mentoring information, the crawling information and a learning information generated by using a big data information that is previously learned;

matching by an update module operated by the processor, the crawling information, the survey result information, or the expert mentoring information to the collected questions to be learned by the big data;

inquiring, by the processor, members regarding an intention to join a supporter when the members signing up for a membership, and controlling, by the processor, the mobile device of the members expressing the intention to join the supporter to automatically install an application from central server;

using, by the processor, information of individual supporter, personality of the supporter, preference of the supporter and a family of the supporter from supporters by the application as basic data and a pattern grouping information for future survey target selection and push service; and receiving, by the processor, a personal information from a questioner through the mobile device;

wherein the receiving personal information from the questioner may comprise, receiving a mandatory input of a child information when the questioner is the parent;

receiving a mandatory input of a parental information when the questioner is the child;

inferring, by the processor, home education needs of the member based on previously collected member information, regardless of the question input through the mobile device;

reading, by the processor, a needs information by searching a big data that pre-learned for the home education needs, and providing the needs information to the member through the mobile device by a push alarm;

generating, by the processor, the needs information by combining and analyzing at least one of the crawling information, the survey result information, and the expert mentoring information when there is no needs information read from the big data, and providing the needs information to the mobile device by the push alarm; and providing, by the processor, benefits for discounts on mobile device and benefits on mobile bill to new member registering to the mobile device or existing member who participate as supporters, input the question or respond to the survey based on their activity performance;

wherein, the generating, by the processor, a survey result information by performing a survey corresponding to the question pattern on pre-registered members, may comprise, analyzing the question pattern to determine a survey target group;

setting survey questions for the survey target group;

performing the survey based on the survey questions; and generating the survey result information from survey performance, wherein, the analyzer analyzes the subject of the question is the parent or the child, in the analyzing the collected question as at least one question pattern, wherein, the information generator generates the crawling information and the expert mentoring information in consideration of the subject of the question, when performing the additional crawling, if the collected question is the question not requiring the professional answer, generates the survey result information by the supporters in consideration of the subject of the question.

2. A system for providing an intelligent home education big data platform comprising a processor operating at least one of a computer program, a code, and an instruction, the system comprising:

a collector collects questions about home education input by a mobile device;

an analyzer analyzes the collected questions into at least one question pattern;

a determiner determines whether an answer information corresponding to the question pattern is recorded in a pre-stored big data and compares the analyzed question pattern with pre-stored big data;

an information generator generates an expert mentoring information corresponding to the question pattern received from experts, or generates a survey result information by performing the survey corresponding to the question pattern on pre-registered members, generates a crawling information by performing additional crawling when the answer information is not recorded as the result of the determination of the determiner, and reads the answer information from the pre-stored big data, when the answer information is recorded in the pre-stored big data as the result of the determination of the determiner;

a reply module replies the crawling information, the survey result information, or the expert mentoring information to the mobile device; and an update module matches the survey result information, the expert mentoring information or the crawling information to the collected questions to be learned by the big data; and wherein, the processor inquires the members regarding an intention to join the supporter member, controls the mobile device of the members expressing the intention to join the supporter to automatically install an application from central server, uses information of individual supporter, personality of the supporter, preference of the supporter and a family of the supporter from supporters by the application as basic data and a pattern grouping information for future survey target selection and push service, includes the step of receiving a personal information from a questioner through the mobile device, receives the mandatory input of a parental information when the questioner is the child, receives the mandatory input of a child information when the client is the parent, infers the home education needs of the member based on the previously collected member information regardless of the question input through the mobile device, reads a needs information by searching for a big data that pre-learned for the home education needs, provides the needs information to members through the mobile device by a push alarm, and generates the needs information by combining and analyzing at least one of the crawling information, the survey result information, and the expert mentoring information when there is no needs information read from the big data, provides the needs information to the mobile device by the push alarm, and provides benefits for discounts on mobile device and benefits on mobile bill to new member registering to the mobile device or existing member who participate as supporters, input the question or respond to the survey based on their activity performance, wherein, the information generator performs the survey corresponding to the question pattern to generate a survey information, analyzes the question pattern to determine the survey target group, sets survey questions for the survey target group, performs the survey based on the survey questions, and generates the survey information from survey performance, wherein, the analyzer analyzes the subject of the question is the parent or the child, wherein the information generator generates the crawling information and the expert mentoring information in consideration of the subject of the question, when performing the additional crawling, if the collected question is the question not requiring the professional answer, generates the survey result information by the supporters in consideration of the subject of the question.

* * * * *